United States Patent [19]

Imai

[11] Patent Number: 6,047,126

[45] Date of Patent: *Apr. 4, 2000

[54] DOCUMENT REQUESTING AND PROVIDING SYSTEM USING SAFE AND SIMPLE DOCUMENT LINKING SCHEME

[75] Inventor: Toru Imai, Tokyo, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/612,556

[22] Filed: Mar. 8, 1996

[30] Foreign Application Priority Data

Mar. 8, 1995 [JP] Japan .................................. 7-047704

[51] Int. Cl.[7] .................................................. G06F 15/82
[52] U.S. Cl. .......................... 395/710; 709/200; 709/217; 709/238
[58] Field of Search ........... 395/200.01, 200.02–200.08, 395/200.09, 761–769, 772–778, 329, 710; 709/200, 217, 238

[56] References Cited

U.S. PATENT DOCUMENTS

| | | | |
|---|---|---|---|
| 4,982,344 | 1/1991 | Jordan ..................................... | 364/521 |
| 5,142,678 | 8/1992 | MacPhail ............................... | 395/650 |
| 5,181,162 | 1/1993 | Smith et al. ............................ | 364/419 |
| 5,204,947 | 4/1993 | Bernstein et al. ...................... | 395/157 |
| 5,297,249 | 3/1994 | Bernstein et al. ...................... | 395/156 |
| 5,303,379 | 4/1994 | Khoyi et al. ........................... | 395/700 |
| 5,333,237 | 7/1994 | Stefanopolous et al. ............... | 395/12 |
| 5,347,632 | 9/1994 | Filepp et al. ........................... | 395/200 |
| 5,355,472 | 10/1994 | Lewis ..................................... | 395/600 |
| 5,367,621 | 11/1994 | Cohen et al. .......................... | 395/154 |
| 5,404,534 | 4/1995 | Foss et al. .............................. | 395/700 |
| 5,442,771 | 8/1995 | Filepp et al. ........................... | 395/650 |
| 5,446,891 | 8/1995 | Kaplan et al. ......................... | 395/600 |
| 5,644,776 | 7/1997 | DeRose et al. ........................ | 395/761 |
| 5,671,428 | 9/1997 | Muragana et al. ..................... | 395/772 |
| 5,694,594 | 12/1997 | Chang .................................... | 395/606 |

OTHER PUBLICATIONS

T. Berners–Lee et al., "The World–Wide Web", *Communications of the ACM* 37(8): 76–82 (1994).

*Primary Examiner*—Zarni Maung
*Assistant Examiner*—Saleh Najjar
*Attorney, Agent, or Firm*—Foley & Lardner

[57] ABSTRACT

A document requesting and providing system capable of realizing the linking to the specified document from another document efficiently and safely. A linking request computer issues a linking request for attaching a link from a first document to a second document, and a client computer issues a document request for the first document. Then, a server computer stores the first document, records a link information indicated by the linking request in correspondence to the first document upon receiving the linking request from the linking request computer, and provides the first document in conjunction with the link information to the client computer upon receiving the document request from the client computer.

37 Claims, 19 Drawing Sheets

FIG.2

```
┌─────────────────────────────────────┐ DOCUMENT B
│ The known browsers for utilizing data│ www.toshiba.co.jp/doc/doc.html
│ of the www include Mosaic ,Chimera   │
│ and Viola.                           │
│                                      │
│                                      │
│                                      │
└─────────────────────────────────────┘

┌─────────────────────────────────────┐
                    │ NCSA(National Center for Supercomputer│
                    │ Applications) is an organization in the│
                    │ University of Illinois.              │
                    │ Mosaic is software developed at NCSA ,│
                    │ which operates on X ,Windows ,       │
                    │ Macintosh , etc.                     │
                    │                                      │
                    └─────────────────────────────────────┘
                              DOCUMENT A
                       www. u_tokyo. ac. jp/lib/mosaic.html
```

FIG.3

```
┌─────────────────────────────────────┐
│ <LINK>                              │
│                                     │
│ The known browsers for utilizing data│
│ of the www include Mosaic ,Chimera  │
│ and Viola.                          │
│                                     │
└─────────────────────────────────────┘
```

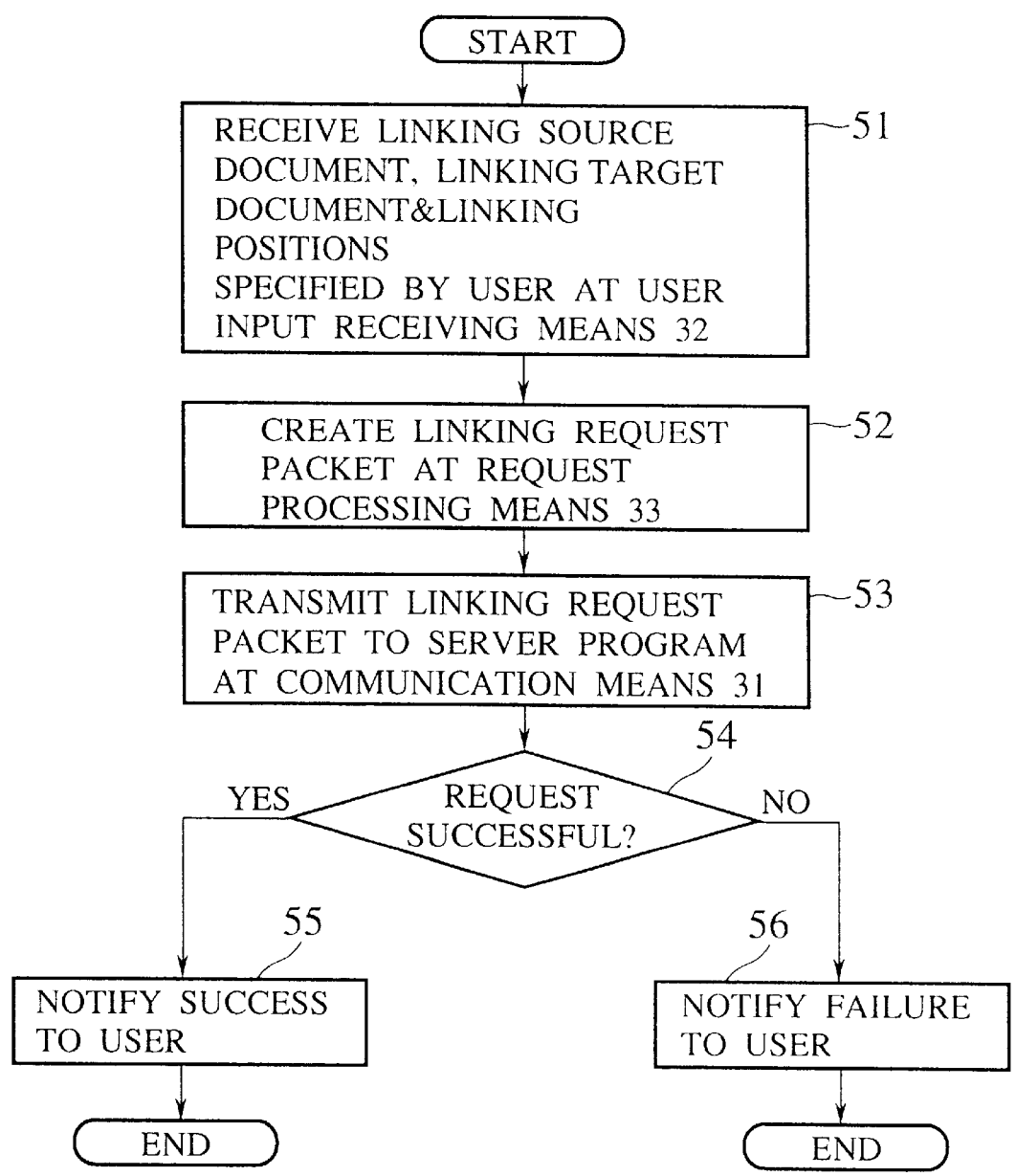

FIG.6

| <LINKING REQUEST> ||
| --- | --- |
| www. toshiba. co. jp/doc/doc.html ||
| 50 | 55 |
| www. u-tokyo. ac. jp/lib/mosaic.html ||

FIG.8

| <DOCUMENT REQUEST> |
|---|
| www. toshiba. co. jp/doc/doc.html |

FIG.10

| 50 | 55 |
|---|---|
| www. u_tokyo. ac. jp/lib/mosaic.html | |

FIG.11

\<LINK\>
The known browsers for utilizing data of the www include \<A HREF = "www.u_tokyo. ac. jp/lib/mosaic. html"\>Mosaic \</A\>,Chimera and Viola.

FIG.12

NCSA(National Center for Supercomputer Applications) is an organization in the University of Illinois.
<A NAME = "mosaic">Mosaic</A> is software developed at NCSA, which operates on X ,Windows , Macintosh , etc.

FIG.13

| <LINKING REQUEST> ||
|---|---|
| www. toshiba. co. jp/doc/doc.html ||
| 50 | 55 |
| www. u_tokyo. ac. jp/lib/mosaic.html # mosaic ||

FIG. 16

The known browsers for utilizing data of the www include Mosaic, Chimera and Viola.

DOCUMENT B
www.toshiba.co.jp/doc/doc.html

NCSA(National Center for Supercomputer Applications) is an organization in the University of Illinois.
Mosaic is software developed at NCSA, which operates on X, Windows, Macintosh, etc.

DOCUMENT A
www. u_tokyo. ac.jp/lib/mosaic.html

Chimera is a browser for UNIX/X which does not require Motif.

DOCUMENT C
abc.co.jp/chimera.html

FIG.17

<LINK>
<VERSION 0>
The known browsers for utilizing data of the www include Mosaic, Chimera and Viola.

FIG.18

| <LINKING REQUEST> ||
|---|---|
| www. toshiba. co. jp/doc/doc.html, V0 ||
| 50 | 55 |
| www. u_tokyo. ac. jp/lib/mosaic.html ||

```
<LINK>
<VERSION 2>
The known browsers for utilizing data of the www include
<A HREF = "www.u_tokyo. ac. jp/lib/mosaic. html"> Mosaic</A>,
<A HREF = "abc.co. jp/chimera. html">Chimera</A>and Viola.
```

DOCUMENT REQUESTING AND PROVIDING SYSTEM USING SAFE AND SIMPLE DOCUMENT LINKING SCHEME

BACKGROUND OF THE INVENTION

1. Field of the Invention

The present invention relates to a document requesting and providing system formed by a document providing computer for providing a document managed therein to another computer connected with it via a network, and a document requesting computer for requesting a document managed by another computer connected with it via a network.

2. Description of the Background Art

A known document providing scheme for providing documents to unspecified many persons includes the WWW (World Wide Web), which is a document providing program for providing pre-stored documents in response to requests from other programs.

In general, a technique for linking a whole or a part of one document with another document is known for the purpose of attaching detailed explanation or related information with respect to that document or a phrase in that document. Documents which are linked together in this manner are collectively referred as a hypertext.

In the hypertext document, a user can selectively obtain detailed explanation or related information according to his need. In general, documents constituting the hypertext document are not necessarily limited to documents owned by the same owner, documents stored in the same computer, or documents stored in computers managed by the same organization.

As for the linking between documents, the following two cases are possible. The first case is a case of linking an own document A to another document B. To this end, it suffices to provide a document format having a function to specify the link from the own document A to the reference target document B, an identifier for uniquely specifying the reference target document, and a document subscription program having a function to retrieve the reference target document according to the document specifying the link. A known example for this type of document linking is realized by the HTML (HyperText Markup Language) as the document format, the URL (Uniform Resource Locator) as the identifier, and the Mosaic as the document browsing program.

The second case is a case of linking from another document B to an own document A. In a conventional document providing scheme such as the WWW, no function for attaching a link to the specified document A from another document B is provided, so that either one of the following schemes have to be adopted in order to realize this type of document linking.

(1) The document B should be stored in a state capable of being changed by anyone, and the owner of the document A should attach a link from the document B to the own document A by changing the document B.

(2) A provider of the document B should be requested to change the document B, and in response the provider of the document B should attach a link from the document B to the document A.

However, these schemes (1) and (2) are associated with the following problems. Namely, the scheme (1) has a problem in that there is a possibility for the alteration of the provided document content by a third person. Moreover, the computer storing the document B has to be set open to unspecified many persons, so that there is also a problem regarding the security. On the other hand, the scheme (2) has a problem in that the provider of the document B has to carry out the operation to attach a link to another document each time a request is received, so that tedious operations have to be required to the provider of the document B.

SUMMARY OF THE INVENTION

It is therefore an object of the present invention to provide a document requesting and providing system capable of realizing the linking to the specified document from another document efficiently and safely, without a possibility for the alteration of the provided document content, a lowering of the security due to an open setting of a document storing computer with respect to unspecified many persons, and a need to require tedious linking operations to a document provider.

According to one aspect of the present invention there is provided a method for providing a document from a first computer to a second computer, comprising the steps of: (a) upon receiving from another computer a linking request for attaching a link from a first document stored in the first computer to a second document, recording a link information indicated by the linking request in correspondence to the first document in the first computer; and (b) upon receiving from the second computer a document request for the first document, providing the first document in conjunction with the link information from the first computer to the second computer.

According to another aspect of the present invention there is provided a document providing computer apparatus, comprising: storage means for storing a first document; first receiving means for receiving from another computer a linking request for attaching a link from the first document to a second document; first request processing means for processing the first document stored by the storage means according to the linking request received by the first receiving means; second receiving means for receiving from one computer a document request for the first document stored by the storage means; and second request processing means for transmitting the first document as processed by the first request processing means to said one computer according to the document request received by the second receiving means.

According to another aspect of the present invention there is provided a document providing computer apparatus, comprising: storage means for storing a first document; first receiving means for receiving from another computer a linking request for attaching a link from the first document to a second document; first request processing means for recording the linking request received by the first receiving means in correspondence to the first document stored by the storage means; second receiving means for receiving from one computer a document request for the first document stored by the storage means; and second request processing means for transmitting the first document stored by the storage means and the linking request recorded by the first request processing means to said one computer according to the document request received by the second receiving means.

According to another aspect of the present invention there is provided a document requesting computer apparatus, comprising: transmitting means for transmitting a document request for a first document, to another computer which stores the first document and a link information for a link from the first document to a second document; receiving means for receiving the first document and the link information transmitted from said another computer in response to the document request transmitted by the transmitting means; and processing means for processing the first document received by the receiving means according to the link information received by the receiving means.

According to another aspect of the present invention there is provided an article of manufacture, comprising: a computer usable medium having computer readable program code means embodied therein for causing a computer to function as a document providing computer for providing documents to other computers, the computer readable program means including: first computer readable program code means for causing the computer to receive from another computer a linking request for attaching a link from a first document stored in the computer to a second document; second computer readable program code means for causing the computer to process the first document according to the linking request received by the first computer readable program code means; third computer readable program code means for causing the computer to receive from one computer a document request for the first document; and fourth computer readable program code means for causing the computer to transmit the first document as processed by the second computer readable program code means to said one computer according to the document request received by the third computer readable program code means.

According to another aspect of the present invention there is provided an article of manufacture, comprising: a computer usable medium having computer readable program code means embodied therein for causing a computer to function as a document providing computer for providing documents to other computers, the computer readable program means including: first computer readable program code means for causing the computer to receive from another computer a linking request for attaching a link from a first document stored in the computer to a second document; second computer readable program code means for causing the computer to record the linking request received by the first computer readable program code means in correspondence to the first document; third computer readable program code means for causing the computer to receive from one computer a document request for the first document; and fourth computer readable program code means for causing the computer to transmit the first document and the linking request recorded by the second computer readable program code means to said one computer according to the document request received by the third computer readable program code means.

According to another aspect of the present invention there is provided an article of manufacture, comprising: a computer usable medium having computer readable program code means embodied therein for causing a computer to function as a document requesting computer for requesting documents from other computers, the computer readable program means including: first computer readable program code means for causing the computer to transmit a document request for a first document, to another computer which stores the first document and a link information for a link from the first document to a second document; second computer readable program code means for causing the computer to receive the first document and the link information transmitted from said another computer in response to the document request transmitted by the first computer readable program code means; and third computer readable program code means for causing the computer to process the first document received by the second computer readable program code means according to the link information received by the second computer readable program code means.

According to another aspect of the present invention there is provided a method for requesting and providing a document, comprising the steps of: issuing a linking request for attaching a link from a first document stored in a server computer to a second document, at a linking request computer; issuing a document request for the first document, at a client computer; recording a link information indicated by the linking request in correspondence to the first document in the server computer, upon receiving the linking request from the linking request computer; and providing the first document in conjunction with the link information from the server computer to the client computer, upon receiving the document request from the client computer.

According to another aspect of the present invention there is provided a document requesting and providing system, comprising: a linking request computer for issuing a linking request for attaching a link from a first document to a second document; a client computer for issuing a document request for the first document; and a server computer for storing the first document, recording a link information indicated by the linking request in correspondence to the first document upon receiving the linking request from the linking request computer, and providing the first document in conjunction with the link information to the client computer upon receiving the document request from the client computer.

Other features and advantages of the present invention will become apparent from the following description taken in conjunction with the accompanying drawings.

BRIEF DESCRIPTION OF THE DRAWINGS

FIG. 2 is a diagrammatic illustration of exemplary linked documents to be obtained by the system of FIG. 1.

FIG. 3 is an illustration of an initial state of an exemplary document to be handled by the system of FIG. 1.

FIG. 5 is a flow chart for the processing of a linking request program in the system of FIG. 1 for a case of realizing the linking of FIG. 4A or FIG. 4B.

FIG. 6 is a diagrammatic illustration of an exemplary linking request packet used in the processing of FIG. 5.

FIG. 8 is a diagrammatic illustration an exemplary document request packet used in the processing of FIG. 7.

FIG. 10 is a diagrammatic illustration of an exemplary linking request record used in the processing of FIGS. 9A and 9B.

FIG. 11 is an illustration of an exemplary document to be provided by the system of FIG. 1 as a result of the processing of FIGS. 9A and 9B.

FIG. 12 is an illustration of an exemplary document to be handled by the system of FIG. 1 for a case of realizing the linking of FIG. 4C or FIG. 4D.

FIG. 13 is a diagrammatic illustration of an exemplary linking request packet used for a case of realizing the linking of FIG. 4C or FIG. 4D.

FIG. 16 is a diagrammatic illustration of an exemplary linked documents to be obtained by the second embodiment of document requesting and providing system according to the present invention.

FIG. 17 is an illustration of an exemplary document to be handled by the system of the second embodiment.

FIG. 18 is a diagrammatic illustration of an exemplary linking request packet used by the system of the second embodiment.

DETAILED DESCRIPTION OF THE PREFERRED EMBODIMENTS

Figure 1:
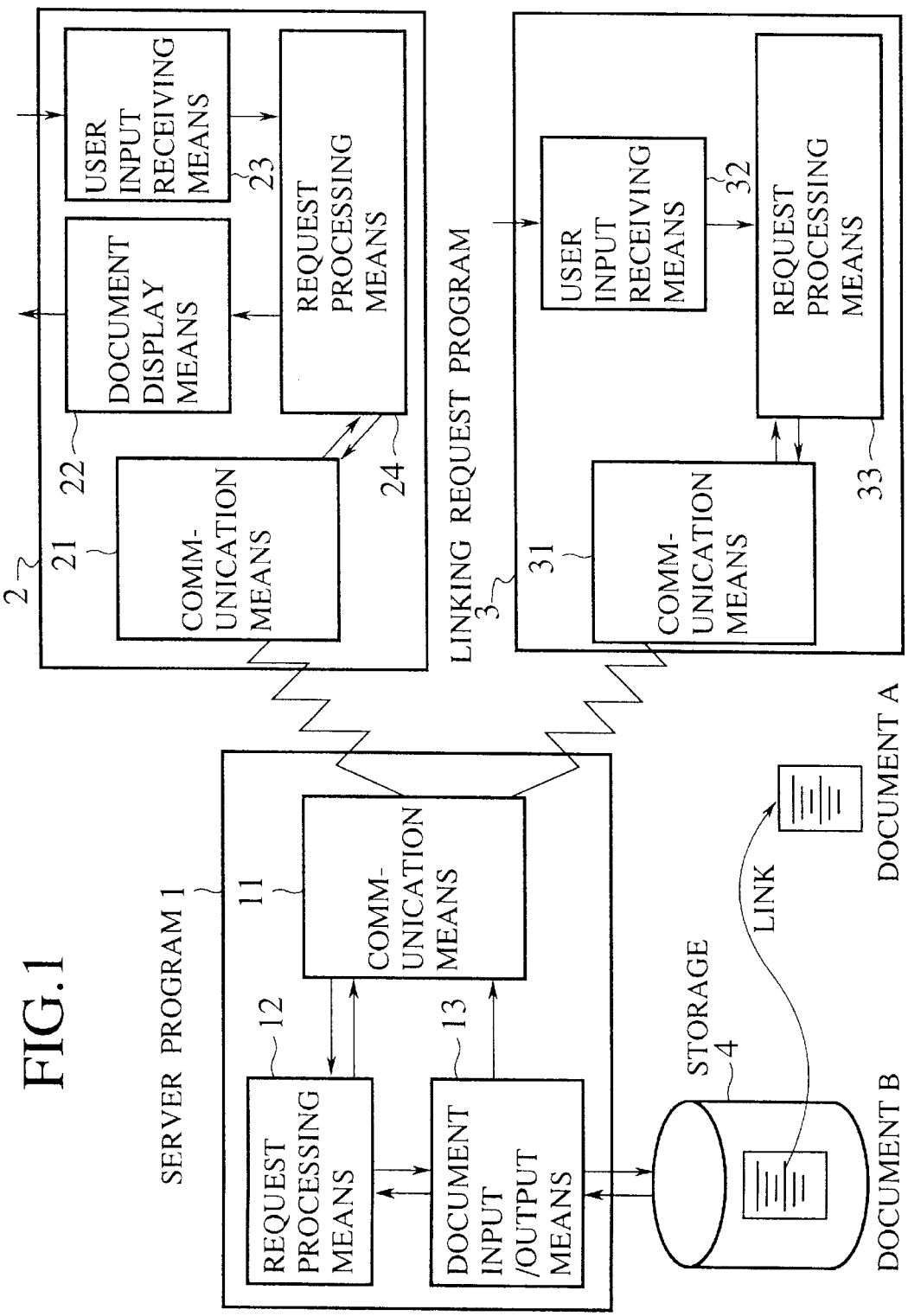
FIG. 1 is a block diagram of an overall configuration of a document requesting and providing system according to the present invention.

Now, the preferred embodiments of a document requesting and providing system according to the present invention will be described with references to the drawings.

Note that, in the following description of the present invention, a document may contain any desired combination of text data, video data, moving image data, still image data, sound data and speech data.

First, the essential features of the present invention will be briefly outlined.

In a case where a creator of a document A wishes to attach a link to the document A from another document B, the linking is requested from a linking request program by specifying identifiers of the documents A and B and linking positions. This request is sent from a communication means of the linking request program to a server program, and received by a communication means of the server program. When a request processing means of the server program confirms that it is the linking request, the request processing means carries out one of the following processing (a) and processing (b).

(a) Attach a link by changing the document B.
(b) Record the request.

The processing result is then stored in a memory means by a document input/output means of the server program.

When a user wishes to subscribe the document B, the user requests this document B by specifying the identifier of the document B from a client program. This request is sent from a communication means of the client program to the server program, and received by the communication means of the server program. When the request processing means of the server program confirms that it is the document request, the request processing means carries out the following processing (c) when the above processing (a) has been carried out for the linking request, or one of the following processing (d) and processing (e) when the above processing (b) has been carried out for the linking request.

(c) Read out the document B by the document input/output means, and provide this document B to the client program.

(d) Read out the document B and the linking request recorded in relation to the document B by the document input/output means, attach a link according to the linking request recorded in relation to the document B, and provide the link attached document B to the client program.

(e) Read out the document B and the linking request recorded in relation to the document B by the document input/output means, and send them both to the client program. At the client program, attach a link according to the linking request recorded in relation to the document B, and display the link attached document B.

As a result, according to the present invention, when the document B is requested from the client program, this document B can be provided in such a manner that the client program can display this document B in a form reflecting the earlier made linking request (for linking from the document B to the document A). At this point, the requests from unspecified many persons to be received by the server program are limited only to the linking requests so that there is no possibility for the alteration of the provided document content by a third person. In addition, there is no need for an open setting of the computer storing the document B with respect to the creator of the document A (who also requests the linking from the document B to the document A) so that the lowering of the security can be prevented. Furthermore, there is no need for the provider of the document B to carry out any operation in response to the linking request, so that there is no need to require the tedious linking operations to the document provider.

Now, with references to FIG. 1 to FIG. 15, the first embodiment of the document requesting and providing system according to the present invention will be described in detail.

In this first embodiment, the system has an overall configuration as shown in FIG. 1, which comprises a server program 1 connected with a storage 4 for providing documents stored in the storage 4, a client program 2 for displaying a document provided by the server program 2 on a screen, and a linking request program 3 for requesting a linking from a document provided by the server program 2 to another document. These three programs may or may not be operating on the same computer.

The server program 1 includes a communication means 11 for making communications such as receiving of requests from the client program 2 and the linking request program 3 and transfer of data to these other programs, a request processing means 12 for carrying out a processing for a request described in a packet transmitted from the client program 2 or the linking request program 3, and a document input/output means 13 for carrying out input/output of documents such as storing of processing results obtained by the request processing means 12 into the storage 4, and reading of documents from the storage 4 and transfer of the read out documents to the request processing means 12 and the communication means 11.

When the request processing means 12 recognizes the received request as the linking request, the linking processing according to this linking request is carried out by the request processing means 12 and the processing result is stored into the storage 4 by the document input/output means 13, whereas when the request processing means 12 recognizes the received request as the document request, the requested document is provided in a form which reflects the result of the linking request.

The client program 2 includes a communication means 21 for making communications with the server program 1, a document display means 22 for displaying the document provided by the server program 1 on a screen, a user input receiving means 23 for receiving inputs from a user, and a request processing means 24 for processing the request entered from the communication means 21 and the user input receiving means 23.

The linking request program 3 includes a communication means 31 for making communications with the server program 2, a user input receiving means 32 for receiving inputs from the user, and a request processing means 33 for processing the request entered from the communication means 31 and the user input receiving means 32.

FIG. 2 shows an example of the linked documents to be obtained by the present invention, where a document B and a document A are independent documents, and there is no link from the document B to the document A initially. Here, the link is to be attached from a word "Mosaic" in the document B to the document A in order to produce a hypertext document formed by a group of documents linked by a link from the document B to the document A.

Each document has an identifier by means of which it can be uniquely identified within a computer network. In this example of FIG. 2, the document A is identified by an identifier "www.u-tokyo.ac.jp/lib/mosaic.html", while the document B is identified by an identifier "www.toshiba.co.Jp/doc/doc.html". In this identifier, a portion from a top to a slash "/" is a name for uniquely specifying the server program, and the rest is a name for uniquely identifying the document under the management of the server program. Here, the naming is made in advance such that different server programs do not use the same name for their identifiers. Consequently, this identifier functions as a name by which the document can be uniquely identified on computers connected via a network.

In general, the document A and the document B are documents owned by different owners, and the owner of the document B does not permit the change of the document B in order to prevent the alteration of the provided document content. Also, in general, the document A and the document B are stored in different computers, and the computer storing the document B is not set open to general users for the purpose of maintaining the security. In other words, the document A and the document B are In a state for which, in order to attach a link from the document B to the document A, the conventional scheme would require the change of the document B by the owner of the document B in response to the request.

FIG. 3 shows an initial state of the document B, where <Link> in the first line indicates that it is possible to attach a link that points from this document to another document upon receiving the linking request from another document side.

Figure 4A:
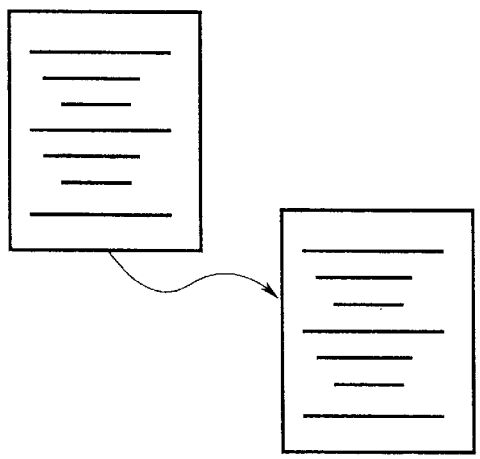
FIGS. 4A. 4B, 4C and 4D are diagrammatic illustrations of four types of linking between documents that can be realized by the system of FIG. 1.
Figure 4B:
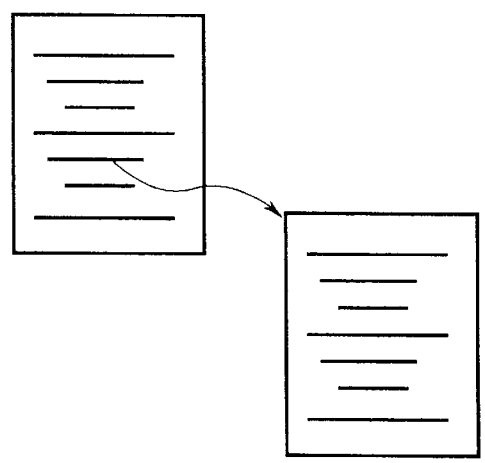
Figure 4C:
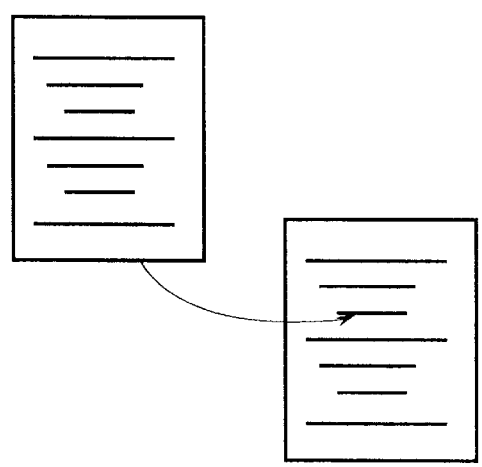
Figure 4D:
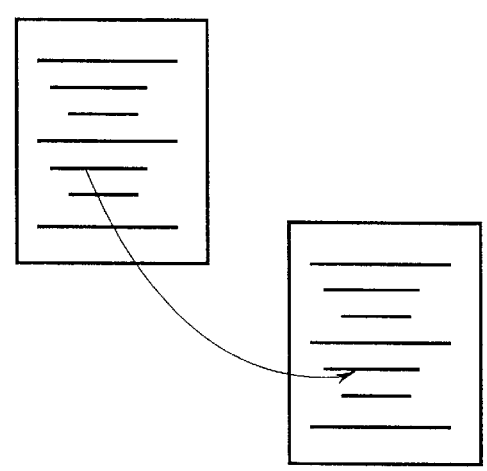

FIGS. 4A to 4D show four different types of linking between documents. Namely, the link can be attached between documents in the following four ways:

(a) A link from a document to a document (FIG. 4A);

(b) A link from a phrase in a document to a document (FIG. 4B);

(c) A link from a document to a phrase in a document (FIG. 4C); and (d) A link from a phrase in a document to a phrase in a document (FIG. 4D).

The above described example shown in FIG. 2 corresponds to the type (b) of FIG. 4B.

In this first embodiment, any of these four types of linking can be realized. In the following, a case of realizing the linking of the type (a) or (b) will be described first, and a case of realizing the linking of the type (c) or (d) will be described later.

For a case of realizing the linking of the type (a) or (b), the linking request program 3 carries out the processing according to the flow chart of FIG. 5 as follows.

First, the user specifies a linking source document, a linking target document, and linking positions in these documents, from the linking request program 3. In a case of attaching a link from a phrase "Mosaic" in the document B to the document A as shown in FIG. 2, the user specifies an identifier "www.toshiba.co.jp/doc/doc.html" for uniquely identifying the document B as the linking source document, an identifier "www.u-tokyo.ac.jp/lib/mosaic.html" for uniquely identifying the document A as the linking target document, and a number of bytes from the top for a phrase "Mosaic" in the document B as the linking position.

This request specified by the user is received at the user input receiving means 32 of the linking request program 3 (step 51), and in response, a linking request packet for this request is created at the request processing means 33 (step 52). An example of a linking request packet to be created here is shown in FIG. 6. This linking request packet is then transmitted to the server program 2 at the communication means 31 (step 53).

When the processing result for this linking request is returned from the server program 2, if the result indicates a success of the request (step 54 YES), the success is notified to the user (step 55), whereas otherwise (step 54 NO), the failure is notified to the user (step 56).

The linking request packet of FIG. 6 to be created by the request processing means 33 of the linking request program 3 contains the following five attributes.

(1) An identifier for indicating that it is the linking request packet;

(2) An identifier of the linking source document;

(3) A start position of a phrase for attaching a link in the linking source document (a number of bytes within the linking source document);

(4) An end position of a phrase for attaching a link in the linking source document (a number of bytes within the linking source document); and (5) An identifier of the linking target document.

Here, a case of attaching a link as shown in FIG. 2 will be described. In this case, the phrase "mosaic" to which the link is to be attached in the linking source document is supposed to have a starting position at the 50-th byte and an ending position at the 55-th byte in the document B. If the linking of the type (a) shown in FIG. 4A is desired, it suffices to define a rule that a value "−1" is to be entered into fields of the starting position and the ending position for the phrase to which a link is to be attached in the linking source document in such a case.

Figure 7:
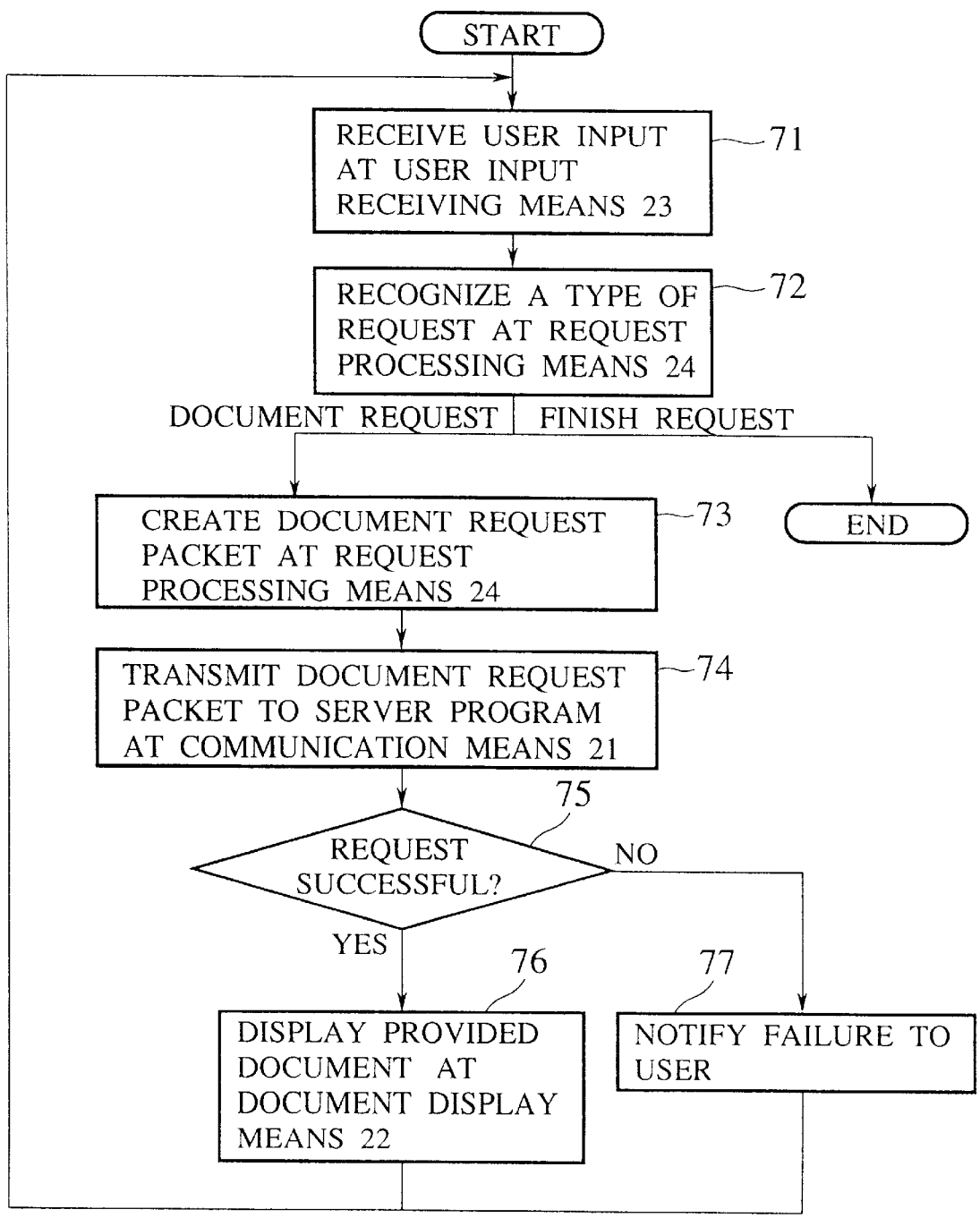
FIG. 7 is a flow chart for the processing of a client program in the system of FIG. 1 for a case of realizing the linking of FIG. 4A or FIG. 4B.

In this case of realizing the linking of the type (a) or (b), the client program 2 carries out the processing according to the flow chart of FIG. 7 as follows.

First, the input from the user is received at the user input receiving means 23 (step 71), and a type of the entered request is recognized at the request processing means 24 (step 72). Here, the request that can be made by the user with respect to the client program 2 is supposed to be either a document request for a document from the server program 1 or a finish request for finishing the processing by the client program 2. When the entered request is the finish request, the client program 2 is simply terminated. On the other hand, when the entered request is the document request, a document request packet for this request is created from the identifier of the document requested by the user at the request processing means 24 (step 73). An example of a document request packet to be created here is shown in FIG. 8. This document request packet is then transmitted to the server program 2 at the communication means 21 (step 74).

When the processing result for this document request is returned from the server program 2, if the result indicates a success of the request (step 75 YES), the document transmitted from the server program 2 is displayed at the document display means 22 (step 76), whereas otherwise (step 75 NO), the failure is notified to the user (step 77).

Note here that the document request to the server program 2 does not necessarily imply a case in which the user requests the desired document by explicitly specifying the identifier of the desired document. This document request to the server program 2 also occurs when there is a link from one document to another document and the user requests the linked document interactively from the client program 2. In such a case, the identifier of the requested linked document is written in the source document from which the link is attached to that linked document, so that it suffices for the client program 2 to create the document request packet according to this identifier.

Note also that the request that can be made by the user with respect to the client program 2 may not necessarily be limited to just the document request of the finish request as described above, and other requests may also be used. For example, it is possible to use a recording request for recording the displayed document, a reading request for reading the recorded document, a search request specifying a keyword with respect to the displayed document, etc. The processings in response to these requests are not directly related to the essence of the present invention and should be obvious to those skilled in the art, so that they will not be described here.

The document request packet of FIG. 8 to be created by the request processing means 24 of the client program 2 contains the following two attributes.

(1) An identifier for indicating that it is the document request packet; and (2) An identifier of the requested document.

Figure 9A:
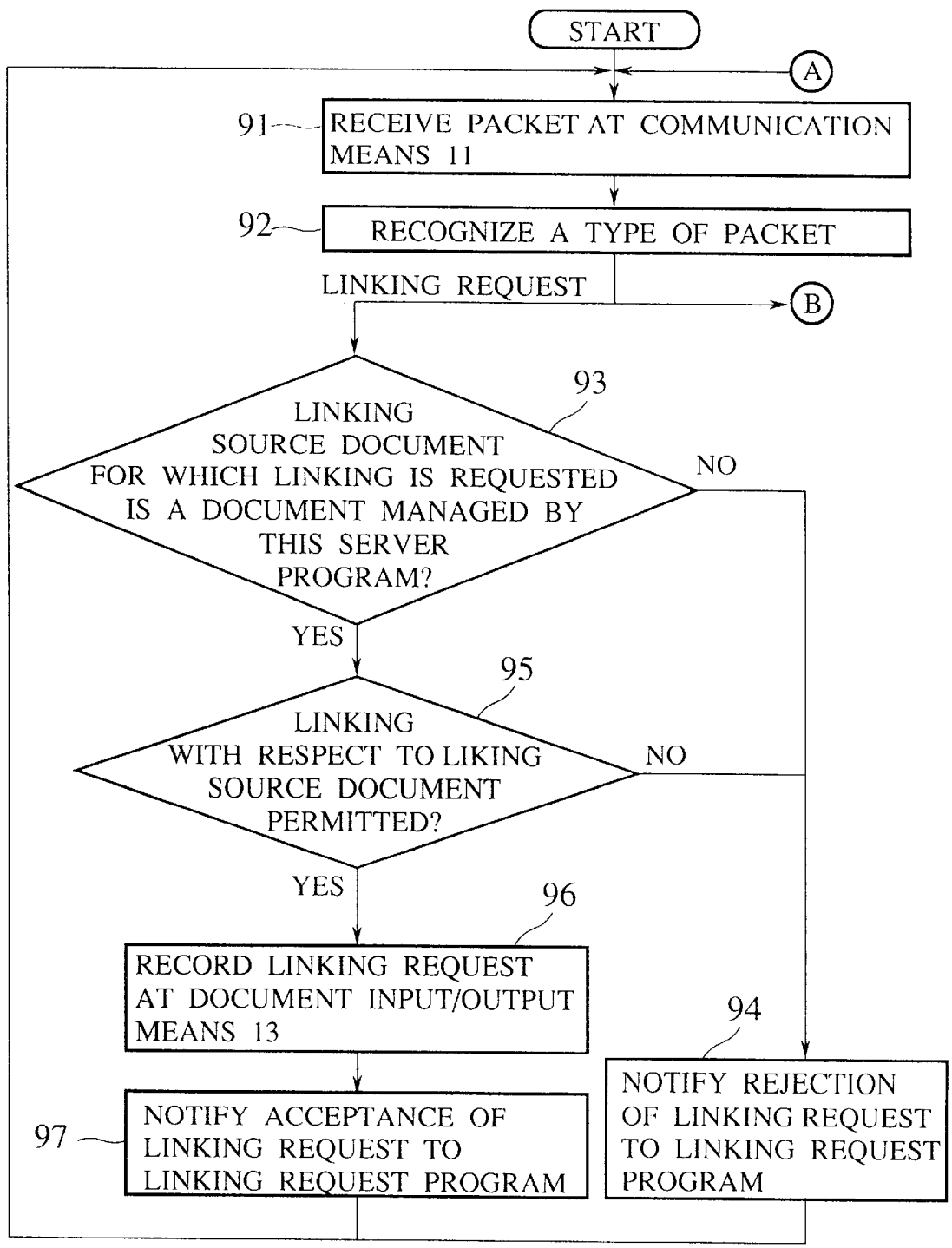
FIGS. 9A and 9B are a flow chart for the processing of a server program in the system of FIG. 1 for a case of realizing the linking of FIG. 4A or FIG. 4B.
Figure 9B:
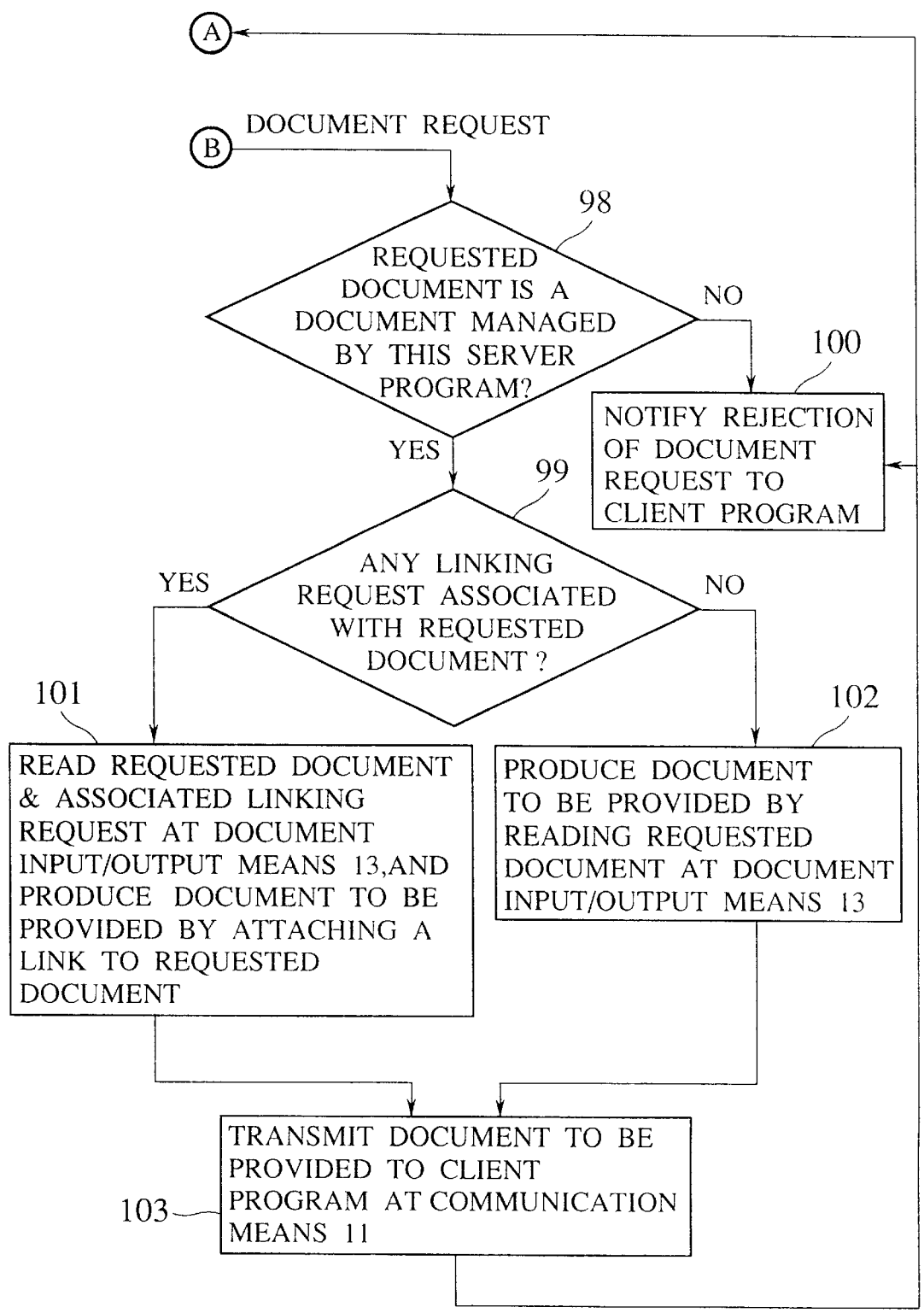

On the other hand, in this case of realizing the linking of the type (a) or (b), the server program 1 carries out the processing according to the flow chart of FIGS. 9A and 9B as follows. Note that unless otherwise noted, the operations in this flow chart of FIGS. 9A and 9B are carried out by the request processing means 12 of the server program 1.

First, it is supposed that the linking request packet of FIG. 6 is transmitted from the linking request program 3.

In this case, the packet is received at the communication means 11 (step 91), and a type of the received packet is recognized at the request processing means 12 (step 92). Here, the type of the received packet can be recognized by referring to the first field of the received packet.

Since the type of the packet is the linking request packet In this case, whether the linking source document for which the linking is requested is a document managed by this server program 1 or not is judged (step 93). Here, whether a portion from a top to a slash "/" of the identifier of the linking source document specified in the received packet is the identifier of this server program 1 or not is checked first, and if so, whether a portion below a slash "/" indicates an existing document for this server program 1 or not is checked. In the example of FIG. 6, if the identifier of the server program 1 is "wnww.toshiba.co.jp" and the document identified by "doc/doc.html" exists, it can be judged that it is the document managed by this server program 1.

Note that the server program 1 can be made to manage every document to be provided under a directory "/www" and set the document identified by "doc/doc.html" in correspondence to a file identified by a file name "/www/doc/doc.html", so that the existence of the document can be checked by simply checking whether it owns that file or not.

If the linking source document is not a document managed by this server program 1, the rejection of the linking request is notified to the linking request program 3 which transmitted the linking request packet via the communication means 11 (step 94).

Otherwise, next, whether the linking with respect to the linking source document for which the linking is requested is permitted or not is judged (step 95). Here, conditions for the permission can be set up in various manners. For example, the owner of the document can specify whether or not to permit the linking from another document in each document. To this end, it is possible to define a rule that a prescribed character string is to be entered at the beginning of the document which permits the linking of a link that points from this document to another document, which is requested from another document side, as shown in FIG. 3, such that whether the linking is permitted or not can be judged by reading the document at the document input/output means 13 and checking this portion of the document whenever the linking request is received at the request processing means 12.

Alternatively, it is also possible to permit the linking when a fee is paid electronically. This can be realized by providing means for paying the fee electronically, and means for recording the payment of the fee.

If the linking is not permitted, the rejection of the linking request is notified to the linking request program 3 which transmitted the linking request packet via the communication means 11 (step 94). Otherwise, the linking request is recorded at the document input/output means 13 (step 96).

Here, it is also possible to adopt a scheme in which the linking request with respect to any document is to be accepted. In such a case, the step 95 to judge whether the linking is permitted or not will be unnecessary. The use of the judgement as to whether the linking is permitted or not is not essential to the present invention.

When the linking is permitted, after the linking request is recorded at the step 96, the request processing means 12 notifies the acceptance of the linking request to the linking request program 3 which transmitted the linking request packet via the communication means 11 (step 97).

FIG. 10 shows an example of a record of the linking request. When the file "/www/doc/doc.html" stores the document identified by "doc/doc.html", a file "/www/doc/doc.html.req" corresponding to that file is created, and the linking position in the linking source document, the linking target document, and the linking position in the linking target document for this linking request are recorded therein. In the example of FIG. 10, the file "/www/doc/doc.html.req" records the linking request associated with the document "doc/doc.html" as the linking source document.

Next, it is supposed that the document request packet of FIG. 8 is transmitted from the client program 2.

In this case, the packet is received at the communication means 11 (step 91), and a type of the received packet is recognized at the request processing means 12 (step 92). Here, the type of the received packet can be recognized by referring to the first field of the received packet.

Since the type of the packet is the document request packet in this case, whether the requested document is a document managed by this server program 1 or not is judged (step 98). Here, whether a portion from a top to a slash "/" of the identifier of the document specified in the received packet is the identifier of this server program 1 or not is checked first, and if so, whether a portion below a slash "/" indicates an existing document for this server program 1 or not is checked. This can be done by the similar manner as in the step 93 described above.

If the requested document is not a document managed by this server program 1, the rejection of the document request is notified to the client program 2 which transmitted the document request packet via the communication means 11 (step 100).

Otherwise, next, whether there is any linking request associated with the requested document or not is judged (step 99). This can be judged by reading the file "/www/doc/doc.html.req" for recording the linking request associated with the requested document "doc/doc.html" at the document input/output means 13 and checking whether any linking request is recorded there or not.

If there is a linking request associated with the requested document, the requested document and the associated linking request are read at the document input/output means 13, and the document to be provided which reflects the associated linking request is produced by attaching a link to the requested document according to the associated linking request (step 101). In the example of FIG. 10, there is only one linking request recorded in the file "/www/doc/doc.html.req", which is requesting an attaching of a link from a character string between the 50-th byte and the 55-th byte to the document "www.u-tokyo.ac.jp/lib/mosaic.html".

FIG. 11 shows the document to be provided which reflects the associated linking request. Here, <A HREF="www.u-tokyo.ac.jp/lib/mosaic.html">Mosaic</A> indicates that a link is attached from the character string "Mosaic" between the 50-th byte and the 55-th byte to the document "www.u-tokyo.ac.jp/lib/mosaic.html".

If there is no linking request associated with the requested document, the document to be provided is produced by reading the requested document alone at the document input/output means 13 (step 102).

Then, the produced document to be provided is transmitted to the client program 2 which transmitted the document request packet via the communication means 11 (step 103).

Note that the format of the document shown in FIG. 11 is equivalent to that resulting in a case in which the creator of the document B attaches a link to another document by himself. Consequently, at the client program 2 which received this document B, the user can be provided with the document A by tracing the link according to the need.

As described, it is possible to attach a link to the document A with respect to the document B, and then this document with the attached link can be provided. There is no change in the document B except for the attachment of the link, so that the alteration of the provided document content of the document B itself can be prevented. In addition, there is no need for an open setting of the computer storing the document B with respect to the third person, so that the lowering of the security can be prevented. Moreover, there is no need for the owner of the document B to carry out the tedious linking operations himself.

Next, a case of realizing the linking of the type (c) or (d) will be described.

This case can be easily realized by modifying the above described case of realizing the linking of the type (a) or (b) as follows.

First, the creator of the document A defines a name with respect to the liking position of the linking target document. For example, in a case of setting the linking position of the linking target document A to the character string "Mosaic", the name is defined as shown in FIG. 12. Here, <A NAME="mosaic">Mosaic</A> indicates that a name "mosaic" is defined with respect to the character string "Mosaic".

FIG. 13 shows an example of a packet transmitted from the linking request program 3 to the server program 1 in this case. Here, the linking target document field has a character string in which "#mosaic" is added after the identifier of the document. This indicates that it is the linking request with the character string named "mosaic" in the document "www.u-tokyo.ac.jp/lib/mosaic.html" as the linking target.

Then, the processings similar to the above described case are carried out using this character string in which "#mosaic" is included as a part of the identifier for the linking target document, and at a time of reading the linking target document and displaying it on a screen at the client program 2 according to the command from the user, a portion surrounding the name "mosaic" is displayed.

In this manner, a case of realizing the linking of the type (c) or (d) can be realized as a simple extension of a case of realizing the linking of the type (a) or (b).

It is to be noted that this first embodiment can be modified as follows. In the above, the server program 1 records the accepted linking request and actually attaches a link according to the linking request only at a time of the document request, but this is not necessarily be the case. Namely, the link may be actually attached by changing the document immediately when the linking request is accepted.

Figure 14A:
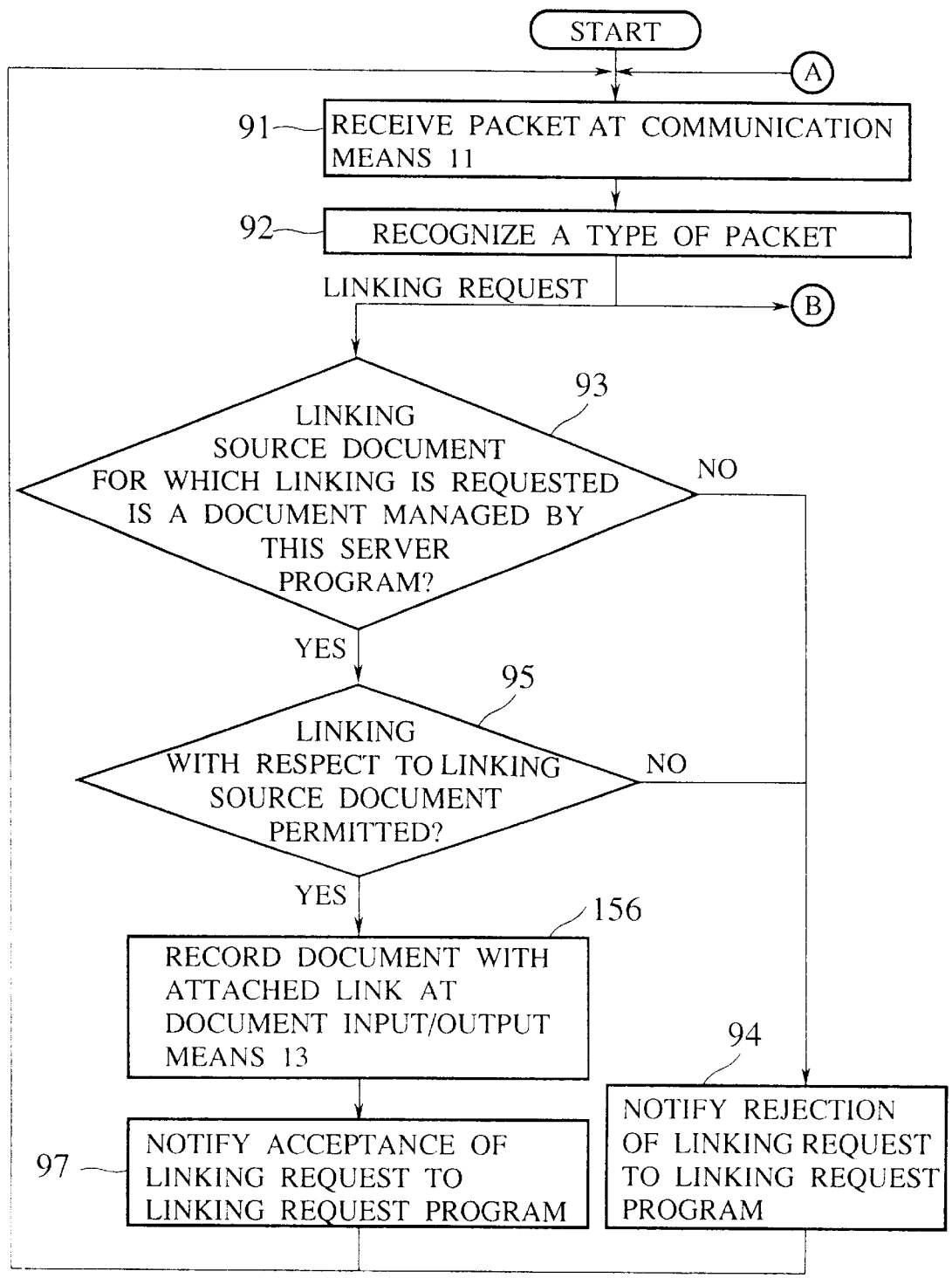
FIGS. 14A and 14B are a flow chart for the processing of a server program in the system of FIG. 1 for a case of realizing the linking of FIG. 4C or FIG. 4D.
Figure 14B:
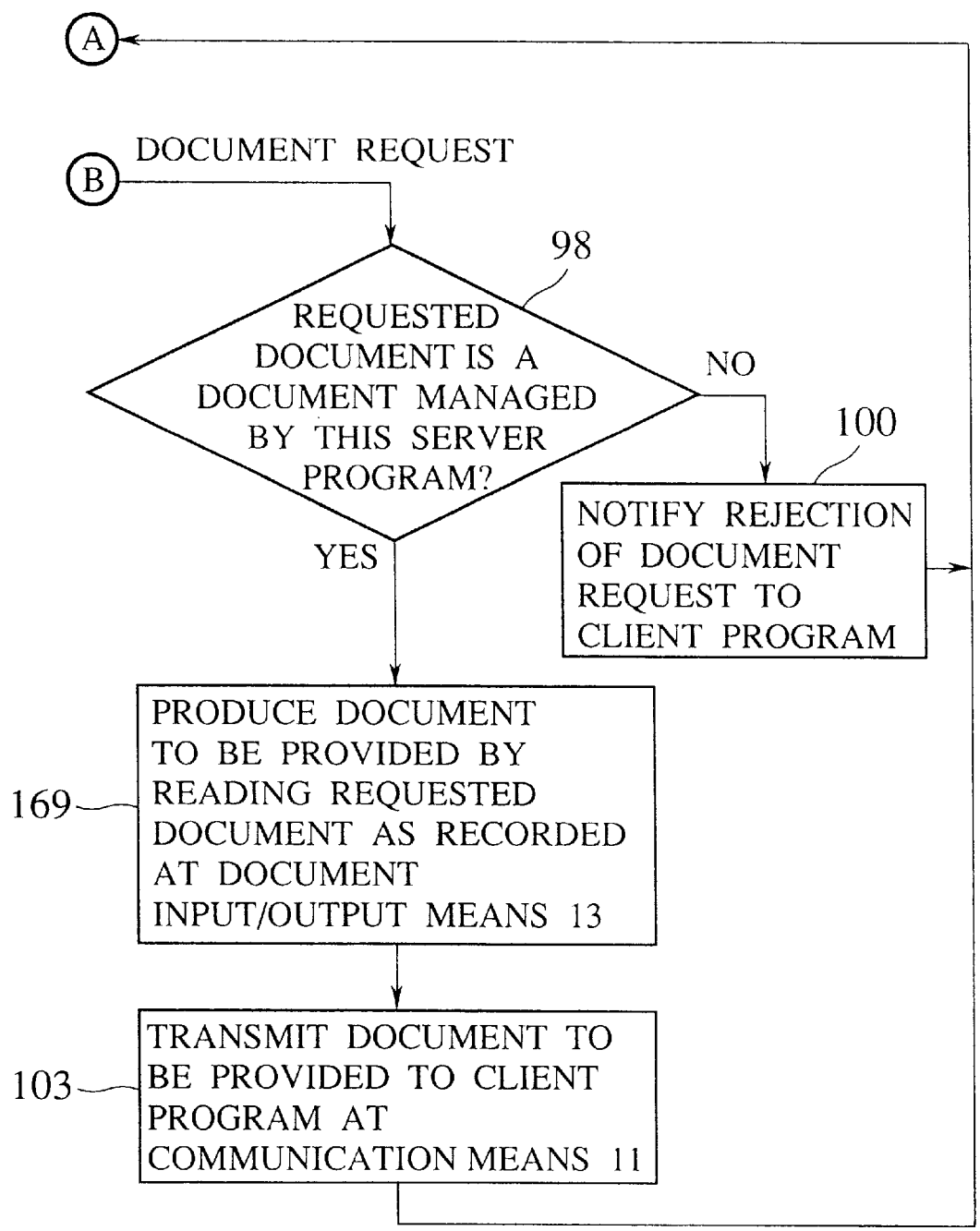

In this case, the server program 1 carries out the processing according to the flow chart of FIGS. 14A and 14B, which includes slight modifications on the flow chart of FIGS. 9A and 9B described above. Here, the unchanged steps are given the same reference numerals in FIGS. 14A and 14B as in FIGS. 9A and 9B, and will not be described here again. The steps to be changed are the step S96 of FIG. 9A which should be replaced by the step 156 as shown in FIG. 14A, and the steps S99, S101, and S102 of FIG. 9B which should be replaced by the step 169 as shown in FIG. 14B.

At the step 156, as soon as the linking request is accepted, the document is changed to attach a link according to the accepted linking request, and the document with the attached link is recorded in the storage 4. The document to be recorded at this point is the same as that shown in FIG. 11.

On the other hand, at the step 169, the document to be provided is produced by reading the requested document as recorded at the step 156 at the document input/output means 13.

It is also to be noted that this first embodiment can also be modified as follows. In the above, the client program 2 and the linking request program 3 are provided as separate programs, but it is also possible to combine them together as a single program.

Figure 15:
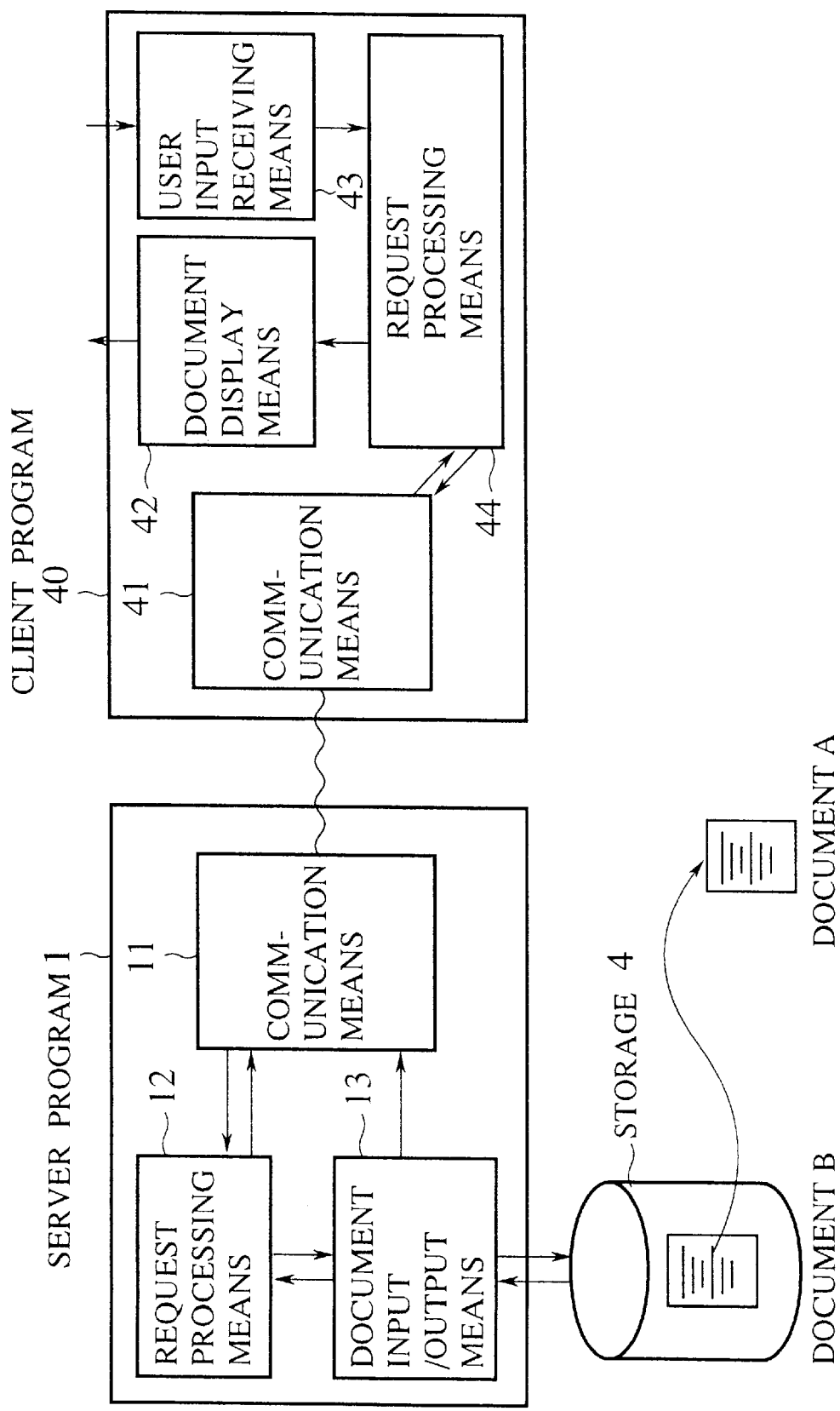
FIG. 15 is a block diagram of a modified overall configuration of a document requesting and providing system according to the present invention.

In this case, the system has an overall configuration as shown in FIG. 15, which comprises the server program 1 similar to that of FIG. 1 which is connected with the storage 4 similar to that of FIG. 1, and a client program 40 which functions both as the client program 2 as well as the linking request program 3 of FIG. 1.

This client program 40 includes a communication means 41 which functions both as the communication means 21 and the communication means 31 of FIG. 1, a document display means 42 similar to the document display means 22 of FIG. 1, a user input receiving means 43 which functions both as the user input receiving means 23 and the user input receiving means 32 of FIG. 1, and a request processing means 44 which functions both as the request processing means 24 and the request processing means 33 of FIG. 1. The processings to be carried out in this modified configuration of FIG. 15 are substantially similar as those described above.

Next, with references to FIG. 16 to FIG. 20, the second embodiment of the document requesting and providing system according to the present invention will be described in detail.

In the first embodiment described above, the client program 2 receives and displays the document in which the linking requests from unspecified many persons are reflected. However, the document reflecting the linking requests have the linking requests inserted therein, so that the position of the character string after the linking request inserted position is displaced to a position different from that in the original document. Consequently, when a plurality of users make the linking requests with respect to the same document, there is a possibility for attaching a link at an incorrect position depending on the order relationship of the linking requests.

For example, consider a case shown in FIG. 16 in which the following operations are carried out sequentially.

(1) The user 1 makes the document request for the document B and reads the document B.

(2) The user 2 makes the document request for the document B and reads the document B.

(3) The user 1 makes the linking request for a link from a phrase "Mosaic" in the document B to the document A.

(4) The user 2 makes the linking request for a link from a phrase "Chimera" in the document B to the document A.

In this case, the user 1 makes the linking request with the 50-th byte to the 55-th byte of the document B as the linking position. Here, the document obtained by the user 1 in response to the document request and the document with respect to which the linking is requested are identical, so that the linking at a correct position is possible.

On the other hand, the user 2 makes the linking request with the 58-th byte to the 64-th byte of the document B as the linking position. However, this linking request by the user 2 will be accepted only after the linking request by the user 1 is accepted, so that by the time of this linking request by the user 2, 38 bytes of <A HREF="vww.u-tokyo.ac.jp/lib/mosaic.html">Mosaic</A> are inserted before the phrase "Chimera" as shown in FIG. 11 in response to the linking request by the user 1. Consequently, a position of the linking target character string "Chimera" of the linking request by the user 2 has been displaced in the document B by the time of the linking request by the user 2, and therefore the linking at a correct position becomes impossible.

In order to prevent such a situation, in this second embodiment, a version number is assigned to each document such that the linking request is made by specifying the version number of the linking source document, and the request processing means of the server program 1 reflects the linking request in the document of the version number specified by the linking request while the version number of the document is increases by one whenever one linking request is reflected in the document.

FIG. 17 shows a format of the document in this second embodiment, where <Link> in the first line indicates that it is possible to attach a link from another document to this document upon receiving the linking request, and <version 0> in the second line indicates that the version number of this document is 0. Thus, the document B shown in FIG. 17 is in a state in which no linking in response to the linking request has been made.

When the document request for the document B by the users 1 and 2 are received in a state without any linking request with respect to this document B, the server program 1 provides the document B as shown in FIG. 17 as it is.

FIG. 18 shows an exemplary linking request packet to be transmitted from the linking request program 3 to the server program 1 in this second embodiment, in which the version number "v0" of the linking source document is added to the identifier of the linking source document.

Figures 19, 20:
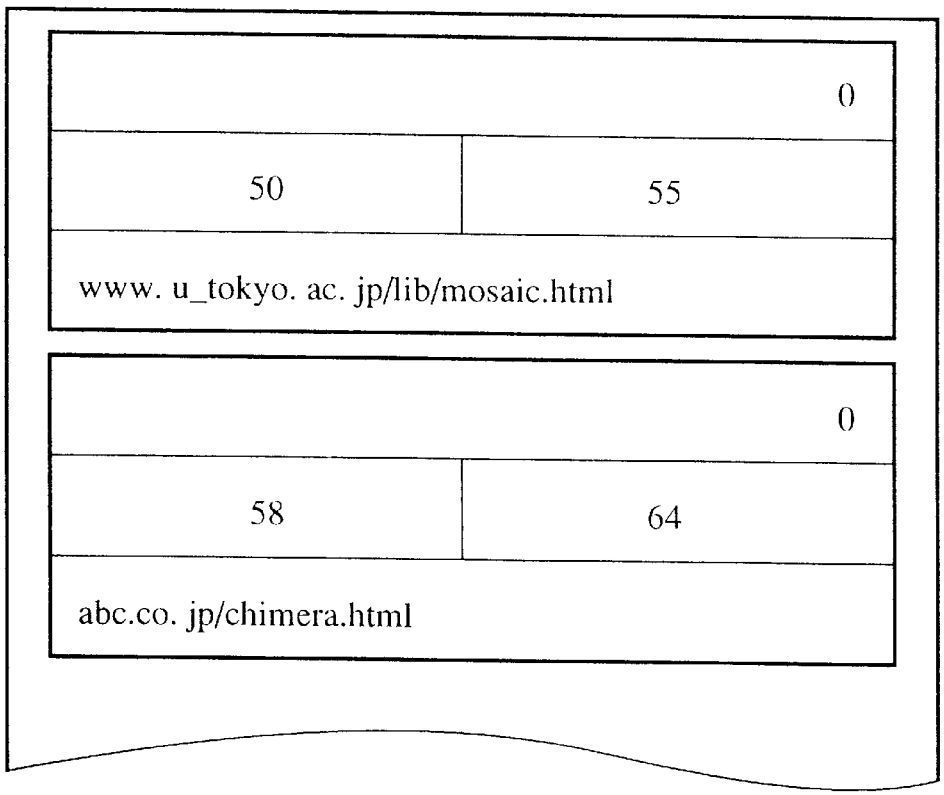
FIG. 19 is a diagrammatic illustration of an exemplary linking request record used by the system of the second embodiment.
FIG. 20 is an illustration of an exemplary document to be provided by the system of the second embodiment.

FIG. 19 shows a state of the linking request record when the linking request from the user 2 is accepted and recorded after the linking request from the user 1 at the server program 1. In each recorded linking request, the version number "0" of the linking source document is recorded in the first field.

When the document request for this document B is made, the request processing means 12 of the server program 1 reflects the recorded linking requests in the document B, in an order by which they are recorded. Namely, an appropriate link is attached to the document of the version number specified by the linking request, and the version number of the document is increased by one each time one linking request is reflected in the document.

FIG. 20 shows an example of the document provided after the linking operation for the linking request by the user 2 is completed. Here, the version number is updated to "2", and the links are attached at correct positions for the two linking requests from the user 1 and the user 2.

Note that the modification related to FIG. 12 and FIG. 13, the modification related to FIGS. 14A and 14B, and the modification related to FIG. 15 for the first embodiment described above are equally applicable to this second embodiment as well.

Figure 21:
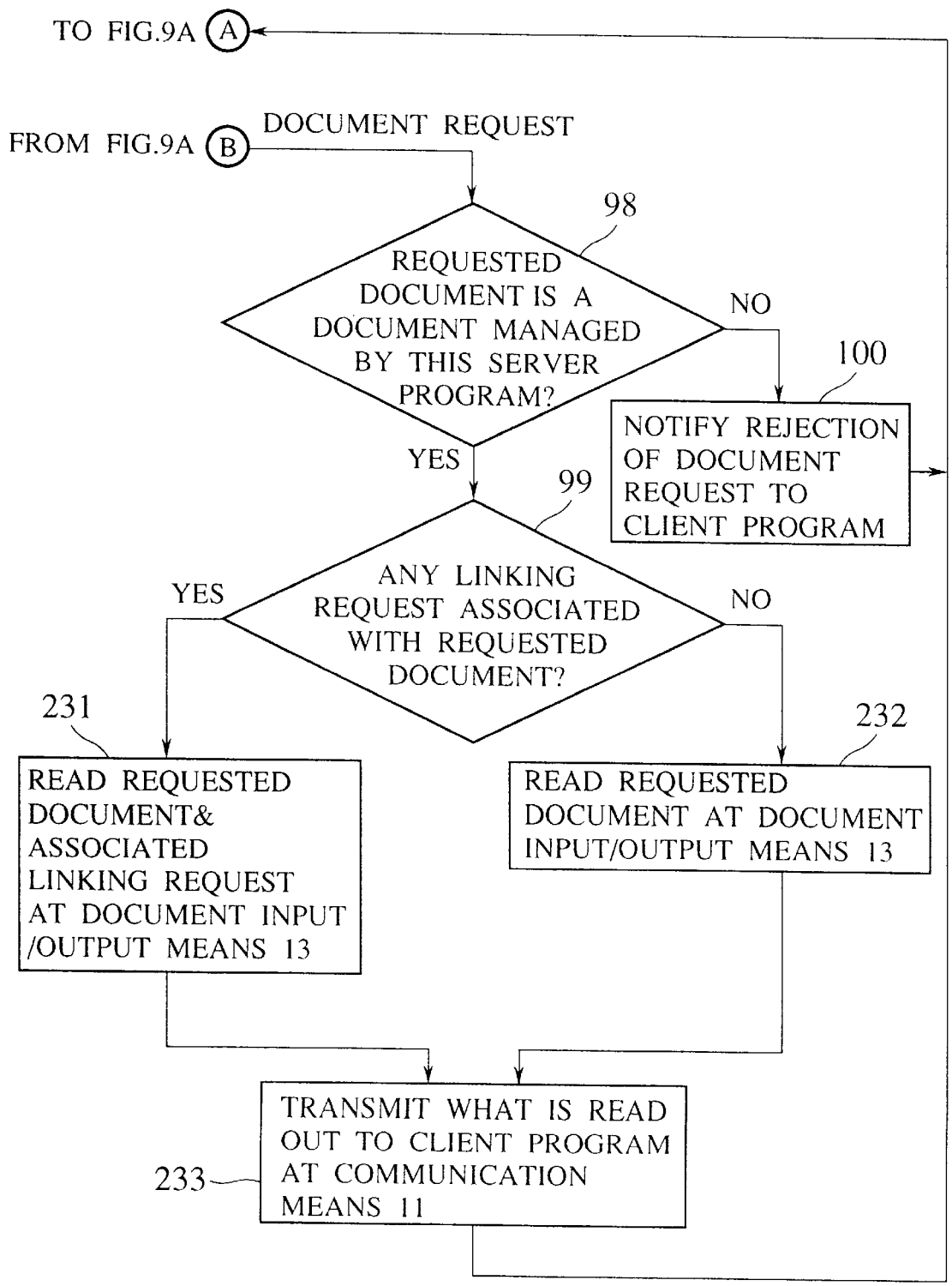
FIG. 21 is a flow chart for the processing at a time of a document request, of a server program in the third embodiment of document requesting and providing system according to the present invention.
Figure 22:
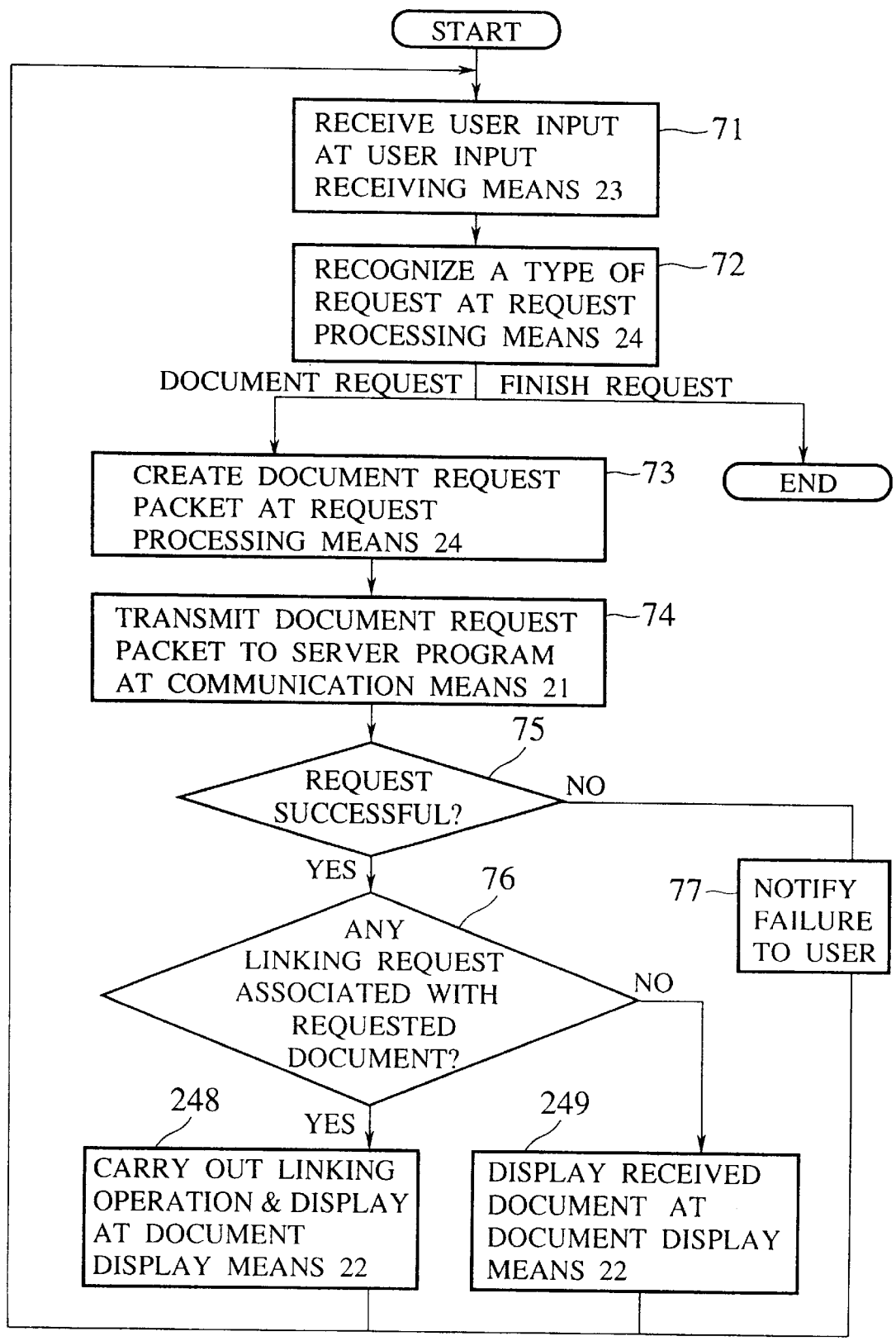
FIG. 22 is a flow chart for the processing of a client program in the system of the third embodiment.

Next, with references to FIG. 21 to FIG. 22, the second embodiment of the document requesting and providing system according to the present invention will be described in detail.

In the first and second embodiments described above, the document resulting after the link is attached at the server program 1 is given to the client program 2. For this reason, there is an advantage that it is possible to utilize the existing client program intended for use in the conventional document providing scheme, which has no linking request processing function itself.

As an alternative realization of the present invention, this third embodiment is directed to a case in which the server program 1 only records the linking request and gives the requested document as well as the recorded linking request associated with that document to the client program 2 in response to the document request, and then the document is edited to reflect the linking request and displayed on a screen at the client program 2. Here, the linking request program 3 and a format of the linking request packet are the same as in the first embodiment described above, but the operation of the server program 1 and the client program 2 are modified as follows.

In this case, at a time of the document request, the server program 1 carries out the processing according to the flow chart of FIG. 21 as follows. This flow chart of FIG. 21 replaces the flow chart of FIG. 9B for the first embodiment described above. Note that the processing at a time of the linking request is identical to that shown in FIG. 9A for the first embodiment, so that the linking request is recorded in the same recording format as in the first embodiment.

In this case, after the steps 91 and 92 of FIG. 9A, the type of the packet is recognized as the document request packet. Then, whether the requested document is a document managed by this server program 1 or not is judged (step 98), and if the requested document is not a document managed by this server program 1, the rejection of the document request is notified to the client program 2 which transmitted the document request packet via the communication means 11 (step 100), similarly as in FIG. 9B.

Otherwise, next, whether there is any linking request associated with the requested document or not is judged (step 99), similarly as in FIG. 9B.

If there is a linking request associated with the requested document, the requested document and the associated linking request are read at the document input/output means 13 (step 231). If there is no linking request associated with the requested document, the requested document alone is read at the document input/output means 13 (step 232). Then, what is read out at the step 231 or the step 232 is transmitted to the client program 2 which transmitted the document request packet via the communication means 11 (step 233).

On the other hand, the client program 2 carries out the processing according to the flow chart of FIG. 22 as follows. This flow chart of FIG. 22 replaces the flow chart of FIG. 7 for the first embodiment described above. In FIG. 22, the steps 71 to 75 and 77 are identical to those in FIG. 7 described above.

When the document request is successful at the step S75, the requested document is transmitted from the server program 1. Then, what is transmitted from the server program 1 is Just the requested document or the requested document along with the associated linking request, i.e., whether there is any linking request associated with the requested document or not is judged (step 246).

If there is a linking request associated with the requested document, the linking operation according to the received linking request is carried out with respect to the received document, and the result of this linking operation is displayed at the document display means 22 (step 248). If there is no linking request associated with the requested document, the received document is displayed as it is at the document display means 22 (step 249).

In this manner, the same effects as in the first and second embodiments described above can also be realized in this third embodiment as well.

In the first embodiment described above, when a plurality of the document requests and the linking requests with respect to the same document are made, there is a possibility for being impossible to attach a link at a correct position depending on the order of the requests. For this reason, it is necessary for the second embodiment described above to resolve this problem by managing the version of the document. In this third embodiment, however, the original document in which the linking request is not reflected will be given to the client program, so that it suffices to specify a position in the original document as each linking position in each linking request, and a link can be attached to a correct position at the client program according to the linking position so specified.

Note that the modification related to FIG. 12 and FIG. 13, and the modification related to FIG. 15 for the first embodiment described above are equally applicable to this third embodiment as well.

In this third embodiment, it is not possible to utilize the existing client program intended for use in the conventional document providing scheme, which has no linking request processing function itself. However, the original document in which the linking request is not reflected will be given to the client program, so that there is an advantage that it becomes easier to display the document according to the preference of the user. For instance, the document before the linking request is reflected can be easily displayed if desired by the user.

It is to be noted that, in the first to third embodiments described above, the start position and the end position of a phrase to which a link is to be attached are specified by a number of bytes from a top of the document, but the linking position may be specified differently. For example, it is also possible to transmit the character string to which a link is to be attached itself to the server program. At the server program, this transmitted character string is searched in the document from a top, and a position where the transmitted character string is found can be set as the linking position. If the transmitted character string cannot be found, the linking request is regarded as a failure.

In general, there is a possibility for the same character string to appear more than once in the document. In view of this fact, the linking position can be specified uniquely by also specifying a sequential number of occurrences for the desired character string corresponding to the desired linking position in the document. For example, when the linking request program specifies the number of occurrences for the character string "Mosaic" as the second occurrence, the server program searches for this character string "Mosaic" in the document from a top, and sets a position at which this character string "Mosaic" is found for the second time from a top as the linking position.

As described, according to the present invention, it is possible to provide a document requesting and providing system capable of realizing the linking to the specified document from another document efficiently and safely, without a possibility for the alternation of the provided document content, a lowering of the security due to an open setting of a document storing computer with respect to unspecified many persons, and a need to require tedious linking operations to a document provider.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

For example, the functions of each one of the server program 1, the client program 2, and the linking request program 3 shown in FIG. 1, and the client program 40 shown in FIG. 15 can be implemented as a separate computer program for controlling the general purpose digital computer to realize the respective functions as described above. Such a computer program can be implemented as a software package to be installed on a general purpose digital computer in practice.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for providing a document from a first computer to a second computer, comprising the steps of:

(a) upon receiving, from a user different from an owner of a first document stored in the first computer, a linking request for attaching a link from the first document stored in the first computer to a second document owned by the user, recording a link information indicated by the linking request in correspondence to the first document in the first computer; and (b) upon receiving from the second computer a document request for the first document, providing the first document in conjunction with the link information from the first computer to the second computer such that the first document appears to have the link to the second document at the second computer without requiring the owner to carry out a linking operation in response to the linking request.

2. The method of claim 1, further comprising the step of:

(c) upon receiving the linking request from the user, judging whether a linking from the first document to the second document is permitted or not according to a prescribed permission condition, such that the step (a) records the link information only when the linking from the first document to the second document is judged as permitted.

3. The method of claim 1, wherein the step (b) provides the first document in conjunction with the link information by incorporating the link information at a linking position in the first document specified by the linking request.

4. The method of claim 3, wherein the first computer stores the first document along with a version number assigned to the first document, the step (a) receives the linking request which specifies a desired version number of the first document, and the step (b) incorporates the link information at the linking position in the first document of the desired version number specified by the linking request, while updating the version number of the first document after the link information is incorporated.

5. The method of claim 1, wherein the step (a) records the link information by incorporating the link information at a linking position in the first document specified by the linking request.

6. The method of claim 5, wherein the first computer stores the first document along with a version number assigned to the first document, the step (a) receives the linking request which specifies a desired version number of the first document, and the step (a) incorporates the link information in the first document at the linking position in the first document of the desired version number specified by the linking request, while updating the version number of the first document after the link information is incorporated.

7. The method of claim 1, wherein the step (b) provides the first document in conjunction with the link information by transmitting the first document along with the link information to the second computer, such that the second computer incorporates the link information at a specified position in the first document specified by the linking request.

8. A document providing computer apparatus, comprising:

a storage unit configured to store a first document;

a first receiving unit configured to receive, from a user different from an owner of the first document, a linking request for attaching a link from the first document to a second document owned by the user;

a first request processing unit configured to process the first document stored by the storage unit according to the linking request received by the first receiving unit;

a second receiving unit configured to receive, from another computer, a document request for the first document stored by the storage unit; and a second request processing unit configured to transmit the first document as processed by the first request processing unit to said another computer according to the document request received by the second receiving unit, such that the first document appears to have the link to the second document at said another computer without requiring the owner to carry out a linking operation in response to the linking request.

9. The apparatus of claim 8, wherein the first request processing means judges whether a linking from the first document to the second document is permitted or not according to a prescribed permission condition, and processes the first document only when the linking from the first document to the second document is judged as permitted.

10. The apparatus of claim 8, wherein the first request processing means processes the first document by incorporating a link information indicated by the linking request at a linking position in the first document specified by the linking request.

11. The apparatus of claim 10, wherein the storage means stores the first document along with a version number assigned to the first document, the first receiving means receives the linking request which specifies a desired version number of the first document, and the first request processing means incorporates the link information at the linking position in the first document of the desired version number specified by the linking request, while updating the version number of the first document after the link information is incorporated.

12. A document providing computer apparatus, comprising:

a storage unit for storing a first document;

a first receiving unit configured to receive, from a user different from an owner of the first document, a linking request for attaching a link from the first document to a second document owned by the user;

a first request processing unit configured to record the linking request received by the first receiving unit in correspondence to the first document stored by the storage unit;

a second receiving unit configured to receive, from another computer, a document request for the first document stored by the storage unit; and a second request processing unit configured to transmit the first document stored by the storage unit and the linking request recorded by the first request processing unit to said another computer according to the document request received by the second receiving unit, such that the first document appears to have the link to the second document at said another computer when the first document is processed according to the linking request at said another computer without requiring the owner to carry out a linking operation in response to the linking request.

13. The apparatus of claim 12, wherein the first request processing unit judges whether a linking from the first document to the second document is permitted or not according to a prescribed permission condition, and records the linking request only when the linking from the first document to the second document is judged as permitted.

14. A document requesting computer apparatus, comprising:
   a transmitting unit configured to transmit a document request for a first document, to another computer which stores the first document and a linking request for attaching a link from the first document owned by an owner to a second document owned by a user different from the owner of the first document;
   a receiving unit configured to receive the first document and the linking request transmitted from said another computer in response to the document request transmitted by the transmitting unit; and
   a processing unit configured to process the first document received by the receiving unit according to the linking request received by the receiving unit, such that the first document appears to have the link to the second document at the document requesting computer apparatus without requiring the owner to carry out a linking operation in response to the linking request.

15. The apparatus of claim 14, wherein the processing means processes the first document by incorporating the link information at a linking position in the first document specified by the link information.

16. An article of manufacture, comprising:
   a computer usable medium having computer readable program code embodied therein for causing a computer to function as a document providing computer for providing documents to other computers, the computer readable program code including:
   first computer readable program code for causing the computer to receives, from a user different from an owner of a first document stored in the computer, a linking request for attaching a link from the first document to a second document owned by the user;
   second computer readable program code for causing the computer to process the first document according to the linking request received by the first computer readable program code;
   third computer readable program code for causing the computer to receives, from another computer, a document request for the first document; and
   fourth computer readable program code for causing the computer to transmit the first document as processed by the second computer readable program code to said another computer according to the document request received by the third computer readable program code, such that the first document appears to have the link to the second document at said another computer without requiring the owner to carry out a linking operation in response to the linking request.

17. The article of manufacture of claim 16, wherein the second computer readable program code judges whether a linking from the first document to the second document is permitted or not according to a prescribed permission condition, and processes the first document only when the linking from the first document to the second document is judged as permitted.

18. The article of manufacture of claim 16, wherein the second computer readable program code processes the first document by incorporating a link information indicated by the linking request at a linking position in the first document specified by the linking request.

19. The article of manufacture of claim 18, wherein the computer stores the first document along with a version number assigned to the first document, the first computer readable program code receives the linking request which specifies a desired version number of the first document, and the second computer readable program code incorporates the link information at the linking position in the first document of the desired version number specified by the linking request, while updating the version number of the first document after the link information is incorporated.

20. An article of manufacture, comprising:
   a computer usable medium having computer readable program code embodied therein for causing a computer to function as a document providing computer for providing documents to other computers, the computer readable program code including:
   first computer readable program code for causing the computer to receive, from a user different from an owner of a first document stored in the computer, a linking request for attaching a link from the first document to a second document owned by the user;
   second computer readable program code for causing the computer to record the linking request received by the first computer readable program code in correspondence to the first document;
   third computer readable program code for causing the computer to receive, from another computer, a document request for the first document; and
   fourth computer readable program code for causing the computer to transmit the first document and the linking request recorded by the second computer readable program code to said another computer according to the document request received by the third computer readable program code, such that the first document appears to have the link to the second document at said another computer when the first document is processed according to the linking request at said another computer without requiring the owner to carry out a linking operation in response to the linking request.

21. The article of manufacture of claim 20, wherein the second computer readable program code judges whether a linking from the first document to the second document is permitted or not according to a prescribed permission condition, and records the linking request only when the linking from the first document to the second document is judged as permitted.

22. An article of manufacture, comprising:
   a computer usable medium having computer readable program code embodied therein for causing a computer to function as a document requesting computer for requesting documents from other computers, the computer readable program code including:
   first computer readable program code for causing the computer to transmit a document request for a first document, to another computer which stores the first document and a linking request for attaching a link from the first document owned by an owner to a second document owned by a user different from the owner of the first document;
   second computer readable program code for causing the computer to receive the first document and the linking request transmitted from said another computer in response to the document request transmitted by the first computer readable program code; and
   third computer readable program code for causing the computer to process the first document received by the second computer readable program code according to the linking request received by the first computer readable program code, such that the first document appears to have the link to the second document at the document requesting computer without requiring the owner to carry out a linking operation in response to the linking request.

23. The article of manufacture of claim 22, wherein the third computer readable program code means processes the first document by incorporating the link information at a linking position in the first document specified by the link information.

24. A method for requesting and providing a document, comprising the steps of:

issuing, from a user different from an owner of a first document, a linking request for attaching a link from the first document stored in a server computer to a second document owned by the user;

issuing a document request for the first document, at a client computer;

recording a link information indicated by the linking request in correspondence to the first document in the server computer, upon receiving the linking request from the user; and providing the first document in conjunction with the link information from the server computer to the client computer, upon receiving the document request from the client computer, such that the first document appears to have the link to the second document at the client computer without requiring the owner to carry out a linking operation in response to the linking request.

25. The method of claim 24, further comprising the step of:

judging whether a linking from the first document to the second document is permitted or not according to a prescribed permission condition at the server computer, upon receiving the linking request from the user, such that the server computer records the link information only when the linking from the first document to the second document is judged as permitted.

26. The method of claim 24, wherein the server computer provides the first document in conjunction with the link information by incorporating the link information at a linking position in the first document specified by the linking request.

27. The method of claim 26, wherein the server computer stores the first document along with a version number assigned to the first document, the user issues the linking request which specifies a desired version number of the first document, and the server computer incorporates the link information at the linking position in the first document of the desired version number specified by the linking request, while updating the version number of the first document after the link information is incorporated.

28. The method of claim 24, wherein the server computer records the link information by incorporating the link information at a linking position in the first document specified by the linking request.

29. The method of claim 28, wherein the server computer stores the first document along with a version number assigned to the first document, the user issues the linking request which specifies a desired version number of the first document, and the server computer incorporates the link information in the first document at the linking position in the first document of the desired version number specified by the linking request, while updating the version number of the first document after the link information is incorporated.

30. The method of claim 24, wherein the server computer provides the first document in conjunction with the link information by transmitting the first document along with the link information to the client computer, such that the client computer incorporates the link information at a specified position in the first document specified by the linking request.

31. A document requesting and providing system, comprising:

a linking request computer for issuing a linking request for attaching a link from a first document owned by an owner to a second document owned by a user different from the owner of the first document;

a client computer for issuing a document request for the first document; and a server computer for storing the first document, recording a link information indicated by the linking request in correspondence to the first document upon receiving the linking request from the linking request computer, and providing the first document in conjunction with the link information to the client computer upon receiving the document request from the client computer, such that the first document appears to have the link to the second document at the client computer without requiring the owner of the first document to carry out a linking operation in response to the linking request.

32. The system of claim 31, wherein the server computer judges whether a linking from the first document to the second document is permitted or not according to a prescribed permission condition at the server computer, upon receiving the linking request from the linking request computer, and records the link information only when the linking from the first document to the second document is judged as permitted.

33. The system of claim 31, wherein the server computer provides the first document in conjunction with the link information by incorporating the link information at a linking position in the first document specified by the linking request.

34. The system of claim 33, wherein the server computer stores the first document along with a version number assigned to the first document, the linking request computer issues the linking request which specifies a desired version number of the first document, and the server computer incorporates the link information at the linking position in the first document of the desired version number specified by the linking request, while updating the version number of the first document after the link information is incorporated.

35. The system of claim 31, wherein the server computer records the link information by incorporating the link information at a linking position in the first document specified by the linking request.

36. The system of claim 35, wherein the server computer stores the first document along with a version number assigned to the first document, the linking request computer issues the linking request which specifies a desired version number of the first document, and the server computer incorporates the link information in the first document at the linking position in the first document of the desired version number specified by the linking request, while updating the version number of the first document after the link information is incorporated.

37. The system of claim 31, wherein the server computer provides the first document in conjunction with the link information by transmitting the first document along with the link information to the client computer, such that the client computer incorporates the link information at a specified position in the first document specified by the linking request.

\* \* \* \* \*